United States Patent [19]

Yokote

[11] Patent Number: 4,664,414

[45] Date of Patent: * May 12, 1987

[54] AUTOMATIC LATCH DEVICE FOR A MOVABLE RUNNER MEMBER USED IN AN AUTOMATIC SEAT BELT SYSTEM

[75] Inventor: Yoshihiro Yokote, Yokohama, Japan

[73] Assignee: Nippon Seiko K.K., Tokyo, Japan

[*] Notice: The portion of the term of this patent subsequent to Nov. 12, 2001 has been disclaimed.

[21] Appl. No.: 352,092

[22] Filed: Feb. 25, 1982

[30] Foreign Application Priority Data

Feb. 28, 1981 [JP] Japan ............................ 56-28469[U]

[51] Int. Cl.⁴ ............................................. B60R 21/10
[52] U.S. Cl. ..................................................... 280/804
[58] Field of Search ........................ 280/804, 802, 803

[56] References Cited

U.S. PATENT DOCUMENTS

| | | | |
|---|---|---|---|
| 3,971,570 | 7/1976 | Nilsson | 280/804 |
| 4,286,804 | 9/1981 | Maekama | 280/804 |
| 4,324,419 | 4/1982 | Ueda | 280/804 |
| 4,334,701 | 6/1982 | Takada | 280/804 |
| 4,354,696 | 10/1982 | Volk et al. | 280/804 |

Primary Examiner—Robert R. Song
Attorney, Agent, or Firm—Wyatt, Gerber, Shoup, Scobie & Badie

[57] ABSTRACT

An automatic latch device for a runner member used in an automatic seat belt system includes a restraining member movably mounted to the runner member and provided with a restraining portion for meshing with a brake member provided on a vehicle body. The restraining member is moved to a non-meshing position by a drive force of a driving member, which is operatively connected to the restraining member, for driving the runner member between a seat occupant restraining position and a seat occupant liberating position, whereby the coupling between the runner member and the brake member may be automatically released substantially simultaneously with the start of the driving of the driving member without needing to move the brake member.

17 Claims, 6 Drawing Figures ously described by reference to FIG. 1 shows a two-point automatic seat belt system employing the first embodiment of the invention.

AUTOMATIC LATCH DEVICE FOR A MOVABLE RUNNER MEMBER USED IN AN AUTOMATIC SEAT BELT SYSTEM

BACKGROUND OF THE INVENTION

1. Field of the Invention

This invention relates to an automatic latch device adapted to automatically latch a runner member in an automatic seat belt system when in response to closing of a door or the like the runner is moved to a position restraining a seat occupant, and to automatically unlatch the runner member in response to opening of the door or the like.

2. Description of the Prior Art

As an automatic latch device of this type, there is known a latch device of the type in which a brake member provided on a vehicle body is adapted to mesh with a restraining portion of the runner member when the runner member is moved into a position restraining a seat occupant. A cam portion of a cam member slidably mounted to the runner member is adapted to disengage the runner member from the brake member when the runner member is moved from its position restraining a seat occupant. However, in the latch device of such type, when the runner member and the brake member are in meshing engagement with each other, the cam member is caused to slide in the direction of movement of the runner member with the runner member remaining unmoved to thereby move the brake member to a non-meshing position. Therefore the meshing engagement between the runner member and the brake member cannot be made sufficiently reliable since the movement of the runner member is in the same direction as that of the sliding movement of the cam member, and this has led to the possibility that the latching between the two members is incomplete. This affects the safety of the seat occupant and must, therefore, be corrected.

SUMMARY OF THE INVENTION

It is an object of the present invention to overcome such a disadvantage of the prior art and to provide an automatic latch device for a runner member in which a restraining member movably mounted to the runner member is provided with a restraining portion for meshing with a brake member provided on the vehicle body, and the restraining member meshing with the brake member is moved to a non-meshing position by the drive force of a driving member operatively connected to the restraining member and provided for moving the runner member between the position restraining the seat occupant and the position liberating the seat occupant. In this way, the coupling between the runner member and the brake member may be automatically released substantially simultaneously with the start of the driving of the driving member without the need to move the brake member.

The invention will become fully apparent from the following detailed description thereof taken in conjunction with the accompanying drawings.

DESCRIPTION OF THE PREFERRED EMBODIMENTS

Figure 1:
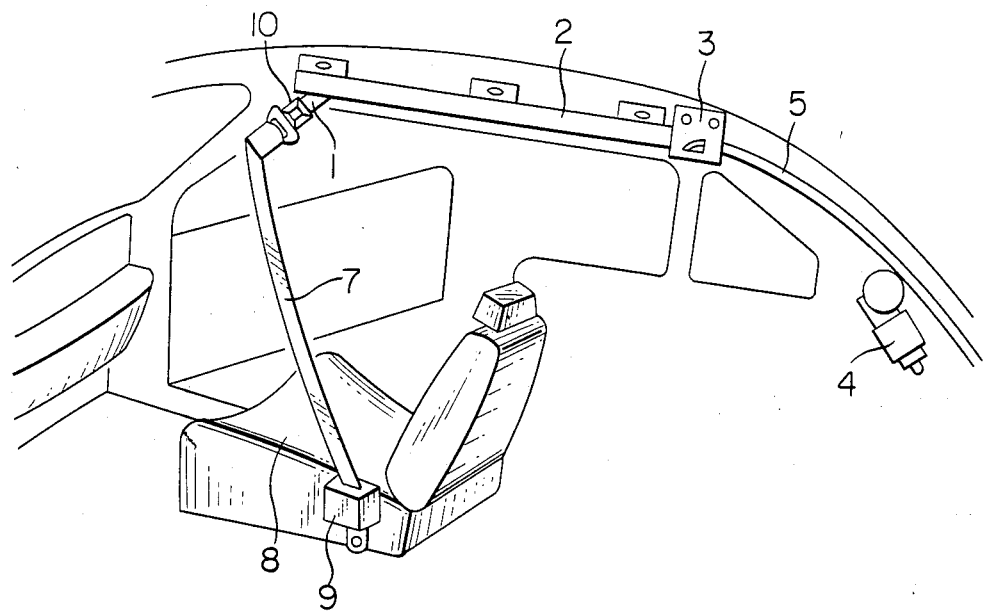
FIG. 1 illustrates of an automatic seat belt system to which a first embodiment of the present invention is applied.

Embodiments of the present invention will hereinafter be described by reference to the drawings. FIG. 1 illustrates an example of the two-point type automatic seat belt system to which a first embodiment of the present invention is applied. In this example, a runner member 1 slides along a guide rail 2 between the position shown wherein a seat occupant is free to enter or leave the seat 8 and a position where a latch base 3 is fixed to a vehicle body secured to a side roof to restrain the seat occupant, in response to the opening and closing of the door or the like. This sliding movement is accomplished by a cable or driving member 6 (FIG. 2) movable in a tube 5 by a drive motor 4. Of course, the runner member 1 may also be driven by a mechanical drive utilizing the door opening-closing force. Further, in the shown seat belt system, webbing 7 extends out from a retractor 9 mounted on the inner side of a seat 8 and is attached to the runner member 1 through an emergency release buckle 10 to release the webbing 7 from the runner member 1 during an emergency. The retractor 9 may be either fixed to the floor portion of the vehicle body or mounted thereto for movement back and forth.

Figure 2:
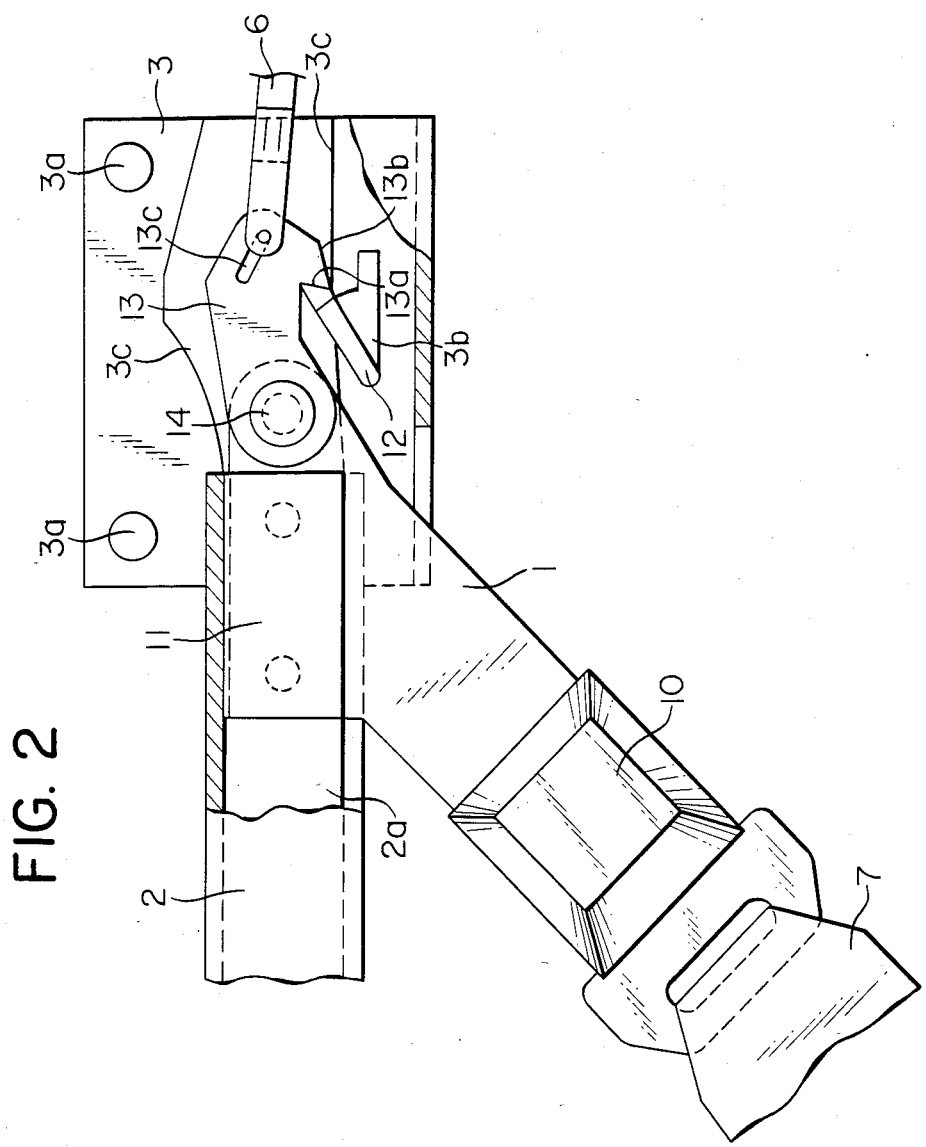
FIG. 2 is a partly broken-away front view of the first embodiment.
Figure 3:
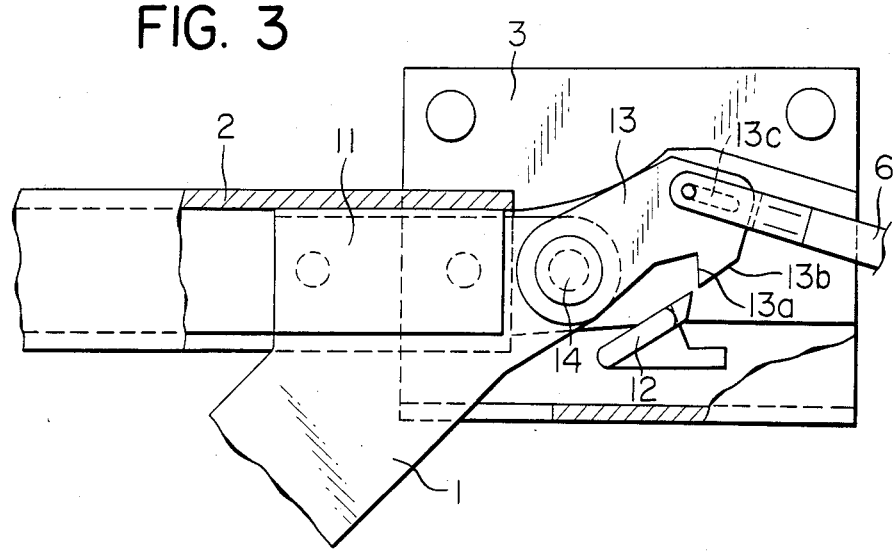
FIG. 3 is a view similar to FIG. 2 but illustrating the operation of the first embodiment.

Reference is now made to FIGS. 2 and 3 to describe a first embodiment which comprises a mechanism in the latch base 3 located at the rear end of the guide rail 2. A sliding member 11 slidable in a groove 2a of the guide rail 2 is fixed to the runner member 1 which is also a movable anchor, and a swingable restraining member 13 formed with a restraining portion 13a for meshing with a brake 12 to be described is mounted for swinging movement about a pin 14. The end of the cable 6 is operatively attached to the restraining member 13. A restraining portion 13a which is a cut-away is formed so that the engaging surface thereof engageable with the brake 12 extends upwardly and rearwardly when the restraining member 13 is in its meshing position, as viewed in the figure. In this way, the brake 12 cannot be disengaged from the restraining portion 13a in the meshing position if a force in is exerted in any direction on the brake 12, and thus, the so-called freely biting-in meshing between the restraining member 13 and the brake 12 is realized.

The restraining member 13 has an inclined portion 13b in the rearward (in the figure, rightward), lower surface thereof so as to enable the swingable restraining member 13 to smoothly assume its latching position, and also has an escape groove 13c extending upwardly and forwardly by some amount from a position somewhat upward of a line passing through the center point of the pin 14 and parallel to the direction of movement of the runner member 1, so that the end portion of the cable 6 is movable in the escape groove. The latch base 3 is fixed to the body of the vehicle by a fastening member such as bolt or the like being passed into a mounting hole 3a, and in the sector hole 3b thereof, the brake 12 is supported for movement between the meshing position with the restraining portion 13a and the non-meshing position. This brake 12 is biased toward the meshing position by a biasing member (not shown).

The latch base 3 is formed with a suitably configured guide surface 3c so as to enable the restraining member 13 to move reliably between the meshing position and the non-meshing position when the member 13 has come into the latch base 3.

Where the cable 6 is driven by a motor, electrical switches such as limit switches for sensing the arrival of the sliding member 11 at the seat occupant restraining position or liberating position to open the switch of the motor 4 are provided near the forward and rearward ends of the guide rail 2.

Operation of the first embodiment having the above-described construction will now be described.

When the runner member 1 lying in the forward seat occupant liberating position is moved rearwardly by movement of the cable 6 in response to closing of the door or the like and comes into the latch base 3, the inclined portion 13b of the restraining member 13 strikes against the brake 12 and advances while moving the brake downwardly towards the non-meshing position. When the restaining portion 13a of the restraining member 13 has passed the brake 12, the brake 12 is returned to the meshing position by the biasing force and comes into mesh engagement with the restraining portion 13a of the restraining member 13 also held in the meshing position by the drive force of the cable 6. When the cable 6 is moved rearwardly, the restraining member 13 is subjected to the force in the direction of the meshing position (clockwise direction) about the pin 14, and this is because the end of the calbe 6 is moved to the rear end of the escape groove 13c lying in the aforementioned position and imparts a tension force to the restraining member 13 there.

In this condition, the force transmitted from the webbing 7 to the runner member 1 is transmitted from the runner member 1 to the restraining member 13 through the pin 14 and further to the brake 12 and the latch base 3, and is received by the body of the vehicle through the fastening member passed into the mounting hole 3a of the latch base 3. Even if the cable 6 should be more or less moved forwardly by its own inertia during collision of the vehicle or the like, the presence of the escape groove 13c prevents the restraining member from being erroneously moved toward the non-meshing position. Accordingly, the restraining portion 13a which has become free to bite in the brake 12 is never disengaged from the brake 12 inadvertently.

Next, when the runner member 1 tries to move toward the seat occupant liberating position, the cable 6 idly runs by an amount corresponding to the length of the escape groove 13c, and then imparts a counter-clockwise rotational force to the restraining member 13 to cause it to rotate counter-clockwisely about the pin 14. Thereby, the restraining member 13 moves to a position shown in FIG. 3 wherein it contacts the upper guide surface 3c formed in the latch base 3, whereupon it is disengaged from the brake 12. Substantially simultaneously therewith, the drive force of the cable 6 is transmitted to the runner member 1, so that the runner member 1 begins to move toward the seat occupant liberating position with the restraining member 13 and in this case, the restraining member 13 smoothly moves into the rail 2 while being guided by the guide surface 3c.

The limitation on the range of the swinging movement of the restraining member 13 need not be provided by the guide surface 3c but instead may be effected, for example, by means such as a projection in the runner member 1 or the restraining member 13. Of course, in this case, it is necessary that a sufficient space be provided to permit the above-described swinging movement of the restraining member 13 in the latch base 3.

Figure 4:
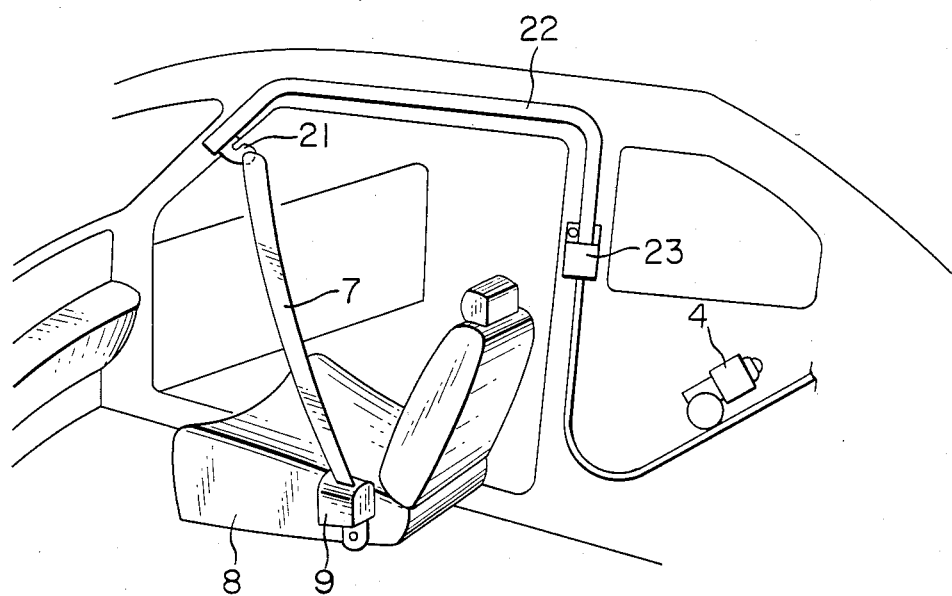
FIG. 4 illustrates of an automatic seat belt system to which a second embodiment of the present invention is applied.
Figure 5:
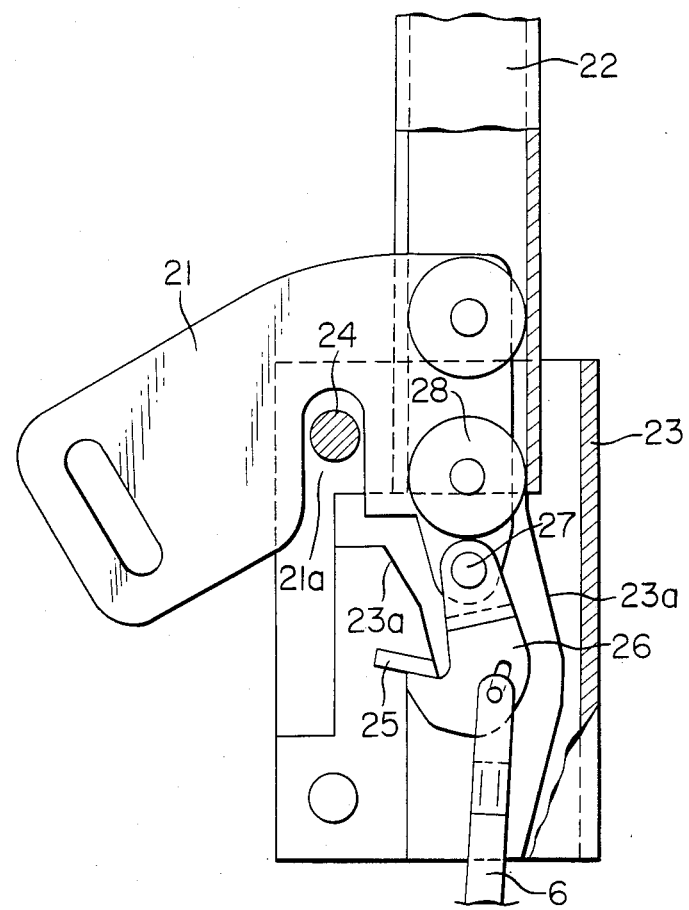
FIGS. 5 and 6 are views similar to FIGS. 2 and 3, respectively, of the first embodiment.
Figure 6:
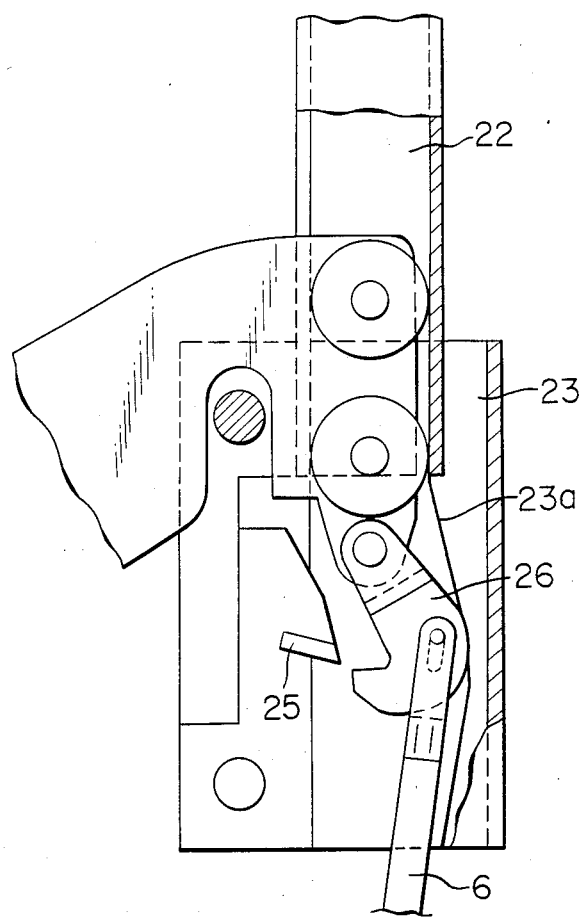

Description will now be made of a second embodiment shown in FIGS. 4, 5 and 6. The second embodiment is an embodiment in a system shown in FIG. 4 wherein a rail 22 extends downwardly within the so-called center pillar of the vehicle.

In the second embodiment, the load acting in the direction forward of the vehicle during collision is received by a pin 24 secured to the vehicle body at a position whereat it fits in a groove 21a of a runner member 21 which is in the seat occupant restraining position, and the latch device according to the present invention serves to prevent the runner member 21 from moving upwardly as viewed in the figure during lateral turning of the vehicle.

The operation of the second embodiment is substantially the same as that of the first embodiment with the exception that a brake 25 is not swingable but fixed to a latch base 23 and therefore the behavior when the runner member 21 comes into its restraining position and a restraining member 26 latches with the brake 25 differs from that in the first embodiment.

This will further be described hereinafter.

When the restraining member 26 moves to the restraining position with the runner member 21 and advances into the latch base 23, the restraining member 26 is guided by a guide surface 23a in the latch base 23 and temporally swings to the non-meshing position before it meshes with the brake 25. When the restraining member 26 clears the position of the brake 25, it is imparted a clockwise rotational force about a pin 27 by the drive force of the cable 6 and wings to the meshing position, thereby bringing about a latchable condition. This condition is shown in FIG. 5.

In this case, instead of using the brake member, a restraining portion which can be a brake may be formed in a part of the latch base 23. Also, the behavior when the runner member 21 tries to move toward the seat occupant liberating position, namely, when the latch is about to be released, is entirely identical to that in the first embodiment, and FIG. 6 shows the condition when the latch has been released. Further, in the present embodiment, a roller 28 is employed instead of the sliding member 11 of the first embodiment.

What is important in the present invention is that the restraining portion for engaging the brake member provided on the latch base which is in the seat occupant restraining position is formed not on the side of the movable anchor to which the webbing is attached, namely, the side of the runner member, but on the side of the restraining member movably mounted on the runner member. By this restraining member being operated by a drive member movable back and forth, engagement or non-engagement occurs between it and the brake member. Accordingly, although in the above-described embodiments, the restraining member is swingably mounted on the runner member, that is not restrictive but the restraining member may also be slidably or otherwise movably mounted on the runner member.

According to the present invention, as has been described above, the restraining member is movably mounted on the runner member, whereby the meshing between the restraining member and the runner member can be released and therefore, there can be provided a highly reliable and structurally simple latch device in which the restraining member can be made free to bite in the brake member during the meshing therebetween.

I claim:

1. An automatic latch device for a movable runner member used in an automatic seat belt system, said device having:
    a runner member having a webbing attached thereto, said runner member being movable between a seat occupant restraining position and a seat occupant liberating position along a guide member secured to a vehicle body;
    a movable restraining member having a restraining portion and mounted on said runner member for movement between a first position and a second position;
    a driving member movable in response to the opening and closing of a door of the vehicle body or the like, means operatively connecting said driving member to said restraining member so as to impart to said runner member a force toward the seat occupant liberating position through said restraining member while imparting to said restraining member a force toward the second position when said driving member tries to move from the seat occupant restraining position to the seat occupant liberating position and to impart to said runner member a force toward the seat occupant restraining position through said restraining member while imparting to said restraining member a force toward the first position when said driving member tries to move from the seat occupant liberating position to the seat occupant restraining position; and
    means including a lock member mounted on a base member secured to the vehicle body so as to mesh with said restraining portion of said movable restraining member which has been moved to said seat occupant restraining position together with said runner member by said driving member and which is substantially in said first position;
    whereby said runner member connected to said base member by said restraining portion meshing with said lock member begins to be moved from said seat occupant restraining position to said seat occupant liberating postion with said restraining member moved to said second position by said driving member substantially as soon as the meshing engagement between said lock member and said restraining portion is released by said movable restraining member being moved from said first position to said second position by movement of said driving member toward said seat occupant liberating position with said lock member remaining unmoved.

2. A latch device according to claim 1, wherein said movable restraining member is swingably mounted on said runner member, and one end of said driving member is mounted on a portion of said movable restraining member which is on the side of said second position when in said first position with respect to a straight line passing through the center of swinging movement of said movable restraining member and parallel to the direction of movement of said runner member.

3. A latch device according to claim 1, wherein said lock member is movable between a meshing position and a non-meshing position and is mounted on said base member while being biased toward said meshing position.

4. A latch device according to claim 1, wherein said lock member is secured to said base member.

5. A latch device according to claim 1, wherein said restraining portion of said movable restraining member is formed so that the meshing engagement between said lock member and said restraining portion becomes free to bite in relative to a load applied from the webbing to said restraining member through said runner member.

6. A latch device according to claim 1, wherein said driving member is mounted on said movable restraining member so that said driving member is movable by a predetermined amount in a direction substantially identical to the direction of movement of said driving member relative to said movable restraining member.

7. A latch device according to claim 1, wherein said base member is formed with a guide surface so that in said seat occupant restraining position, said movable restraining member is movable between said first position and said second position.

8. A latching device for an automatic seat belt system for securing an occupant within a seat of a vehicle, the seat belt system having a runner connected to an end portion of a seat belt webbing and means including a driving member connected to said runner for moving it automatically between a first position holding said webbing away from any occupant of the seat and a second position bringing said webbing into a position restraining any occupant of the seat, said latching device including:
    a base member adapted to be secured within said vehicle at the second position of said runner and carrying a locking member;
    means including a restraining member mounted movably on said runner and having a restraining portion adapted to be securely held by said locking member when said runner has been brought to its second position; and
    means interconnecting said driving member and said restraining member for moving the latter to disengage said restraining portion from said locking member as said driving member begins to move the runner back towards its first position.

9. A latching device according to claim 8, said restraining member being connected pivotably to said runner with said restraining portion being formed on one side of the forward portion of said restraining member, and means connecting said driving member to said restraining member at a location on the other side portion thereof so that during movement of said driving member towards said first position said restraining member can pivot away from said locking member.

10. A locking device according to claim 9, said locking member and said retraining portion having engaging surfaces arranged to more tightly engage one another as tensile forces are applied to said webbing when said runner is in said second position.

11. A locking device according to claim 9, including means mounting said locking member movably to said base member so that said locking member may be moved out of the path of movement of said restraining member as the runner is moved into its second position, and then returned into said path of movement.

12. A locking device according to claim 9, said locking member being mounted fixedly to said base member and said restraining member including means for allowing it to pivot and ride over said locking member as said runner is moved to its second position.

13. A locking device according to claim 9, including means connecting said driving member to said restraining member so that said restraining member is not moved by said driving member during a limited range of its initial movement to move the runner from its second position.

14. A locking device according to claim 8, said locking member and said restraining member portion having engaging surfaces arranged to more tightly enage one another as tensile forces are applied to said webbing when said runner is in said second position.

15. A locking device according to claim 8, including means mounting said locking member movably to said base member so that said locking membe may be moved out of the path of movement of said restraining member as the runner is moved into its second position, and then returned into said path of movement.

16. A locking device according to claim 8, said locking member being mounted fixedly to said base member and restraining member including means for allowing it to pivot and ride over said locking member as said runner is moved to its second position.

17. A locking device according to claim 8, including means connecting said driving member to said restraining member so that said restraining member is not moved by said driving member during a limited range of its initial movement to move the runner from its second position.

* * * * *